United States Patent
Darlington (10) Patent No.: US 7,243,460 B2
(45) Date of Patent: Jul. 17, 2007

(54) SUPPORT FOR VERTICAL HYDROPONIC PLANTS MATRIX

(75) Inventor: Alan Blake Darlington, Guelph (CA)

(73) Assignee: Air Quality Solutions Ltd., Guelph, Ontario (CA)

( * ) Notice: Subject to any disclaimer, the term of this patent is extended or adjusted under 35 U.S.C. 154(b) by 90 days.

(21) Appl. No.: 10/942,872

(22) Filed: Sep. 17, 2004

(65) Prior Publication Data

US 2005/0055879 A1    Mar. 17, 2005

(30) Foreign Application Priority Data

Sep. 17, 2003  (GB) ................... 0323773.2
Sep. 18, 2003  (GB) ................... 0321865.8

(51) Int. Cl.
*A01G 31/02*    (2006.01)
*A01G 31/00*    (2006.01)

(52) U.S. Cl. ................ 47/62 R; 47/59 S; 47/62 C (58) Field of Classification Search ............. 47/59 R, 47/64, 59 S, 60, 61, 62 R, 62 A, 62 C, 62 N, 47/63, 48.5

See application file for complete search history.

(56) References Cited

U.S. PATENT DOCUMENTS 3,092,442 A    6/1963  Shoemaker
6,105,309 A *  8/2000  Takayanagi ............... 47/62 R
6,502,350 B1   1/2003  Dick
6,727,091 B2   4/2004  Darlington
2004/0063194 A1  4/2004  Darlington

FOREIGN PATENT DOCUMENTS

| | | |
|---|---|---|
| DE | 2733428 | 2/1979 |
| EP | 1 210 868 | 6/2002 |
| EP | 1 367 334 | 12/2003 |
| GB | 2 297 087 | 7/1996 |
| JP | 11318205 | 11/1999 |
| JP | 2002238356 | 8/2002 |
| JP | 2002238379 | 8/2002 |
| NL | 1 001 236 | 10/1995 |
| WO | WO 01/93990 | 12/2001 |

\* cited by examiner

*Primary Examiner*—T. Nguyen
(74) *Attorney, Agent, or Firm*—Anthony Asquith Corp (57) ABSTRACT

The plant roots are embedded in a fibrous matrix material, which is oriented vertically. The matrix material is fixed to a support structure using a grid of fasteners. The support structure may be standard corrugated plastic sheeting, or a moulded plastic sheet. If biodegradable materials are used, they must be protected from humidity etc. The fibrous material is strong enough to support itself, and the embedded plants, between the fasteners, so long as the grid spacing of the fasteners is less than ¼-meter.

13 Claims, 6 Drawing Sheets

SUPPORT FOR VERTICAL HYDROPONIC PLANTS MATRIX

This invention relates to treatment of indoor air by passing the air over and through the roots of plants. The invention is a development of the technology as disclosed in patent publication CA-2,388,583, to which attention is directed.

As disclosed in '583, the plants are placed in what may be termed a vertical hydroponic configuration. The roots of the plants are enmeshed in a sheet of preferably fibrous non-biodegradable plastic matrix material. Generally, the preferred matrix is woven and matted loosely enough that the fibrous matrix has only a small structural strength—especially given that, in operation of the apparatus, the sheet of fibrous matrix hangs as a vertical sheet.

The sheet of fibrous material may be storeys high in some cases. That being so, the fibrous matrix has to be attached to a backing structure. A preferred aspect of the present invention relates to the backing structure.

As disclosed in '583, a plenum chamber is provided behind the matrix. Air is drawn into the plenum chamber through the roots of the plants embedded in the sheet of fibrous matrix. Colonies of microbes on the roots act to break down the contaminants in the air. Although a single pass-through might not be enough to clean the air significantly, if the air is enclosed (as in a room) and the air is recirculated through the matrix and roots repeatedly, impressive reductions in airborne organic contaminants can be achieved.

A preferred aspect of the present invention relates to combining the matrix backing structure with the chamber, pockets, ducts, etc of the air circulation system.

Exemplary embodiments of the invention will now be described with reference to the accompanying drawings, in which.

The apparatuses shown in the accompanying drawings and described below are examples. The scope of the protection sought is defined by the accompanying claims, as amended.

Figure 1:
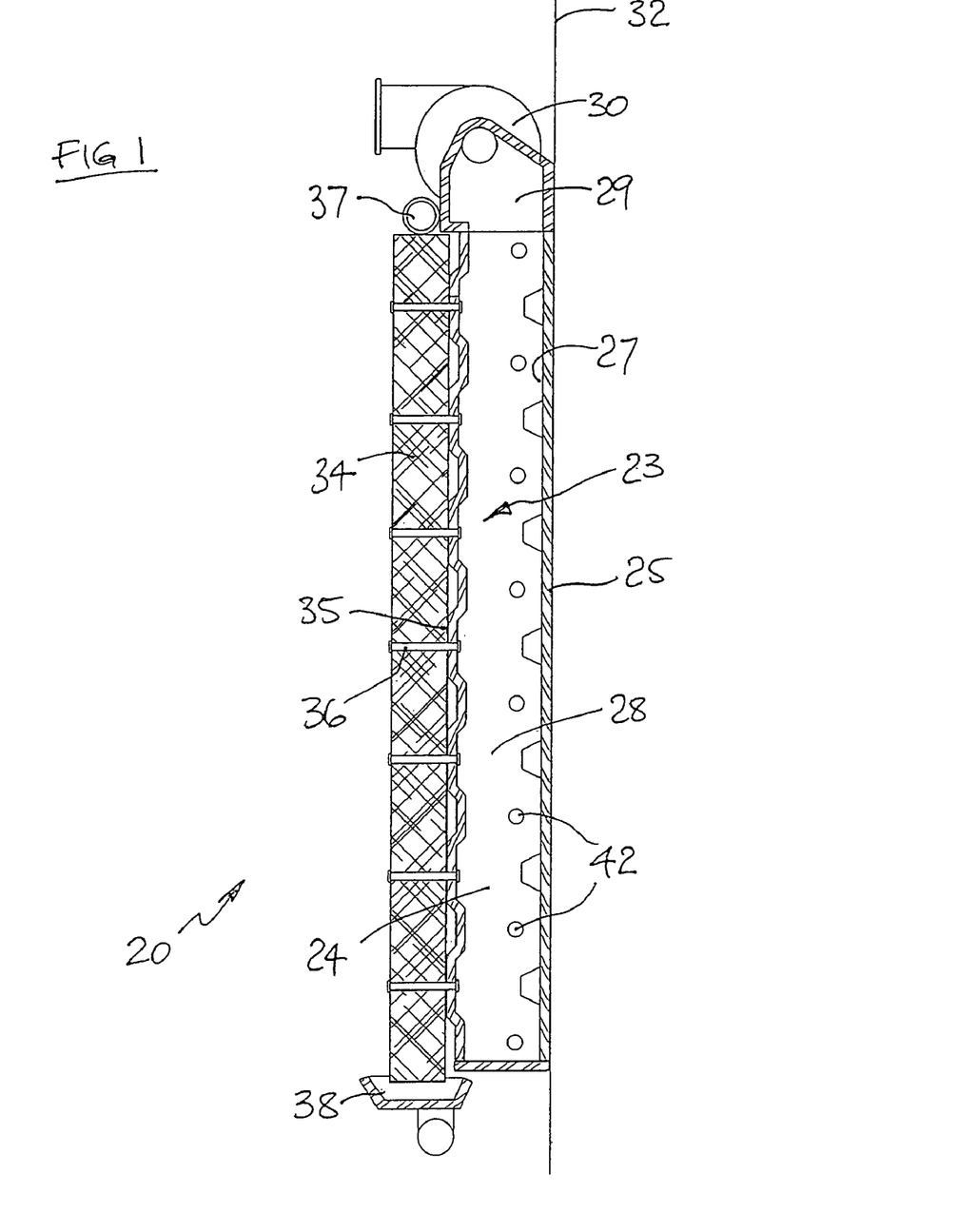
FIG. 1 is sectioned side-elevation of a hydroponic air-treatment apparatus that embodies the invention.

In FIG. 1, the apparatus 20 includes a backing structure 23, which comprises a shaped plastic form 24 and a plain plastic sheet 25. The form 24 is vacuum-formed over a mould to the shape as shown in FIGS. 2,3,4,5. The form is generally that of a corrugated sheet, having longitudinal ribs 26. The form may be constructed in other ways, for example as a rotation-moulding.

The plain sheet 25 is glued, or welded, or secured with fasteners, to the areas 27 of the form 24. Thus, air passageways 28 are created inside and behind the ribs 26 of the form 24. The sides and ends of the form 24 are enclosed and sealed by suitable means. A manifold 29 is provided at the top ends of the passageways 28, and a fan 30 draws air through the manifold 29, so the pressure in the passageways 28, i.e within the plenum chamber, is less than the atmospheric pressure in the room.

The structure 20 is disposed vertically, and is attached to the wall 32 of the room in which the air is to be treated. The fibrous matrix 34, which will hold the roots of the plants, is fixed to the crests 35 of the ribs 26 of the form 24 using suitable fasteners 36. The plants to be added are typically pre-grown in pots and are transplanted into the fibrous matrix 34 after the matrix and the rest of the structure 20 have been attached in place on the wall 32. Moving the apparatus 20 with the plants embedded therein is not preferred.

The water supply and circuit of the vertical hydroponic apparatus are added, including a trickle-pipe 37, having nozzles, on top of the matrix, and a collecting trough 38 at the bottom. Water from the nozzles trickles down through the matrix 34, preferably constantly. The nutrients for the plants are supplied via the water, using hydroponic apparatus (not shown), preferably as described in the said CA-2,388,583. The fibrous matrix 34 preferably is biologically inert.

The fibrous matrix 34 comprises loosely woven or matted fibres of plastic material. The fibres are held together with glue. The designer should select the materials of the fibres and the glue on the basis that the matrix 34 should not deteriorate over a long service life—which may be several years. The plants themselves may also last that long, although periodic maintenance of the botanical aspects of the apparatus should be scheduled.

Preferably, the fibres should be of fibreglass, and free of toxic resins and glues. The hard fibres should be matted to form a bulk material having a density between 0.02 and 0.05 grams per cc. The fibre diameter should be between 0.15 mm and 0.4 mm, being between 400 and 800 denier. At least most of the fibres in the matrix should be at least five cm long.

The fibrous mat should be 1.5 cm to four cm thick. At that, the preferred mat material can be compressed with the fingers, and springs back slowly when released. The mat, i.e the fibres of the mat, can be pulled apart with a strong hand pull. The fibres may be eased apart by finger manipulation to allow the insertion of plant roots. The preferred mat has some rigidity, in itself; that is to say, a small piece of two-cm thick mat, say ½ sq.m., is self-supporting. A larger sheet (say more than one sq.m.) of the mat is floppy and not self supporting.

The preferred mat has a water holding capacity of between 0.02 and 0.1 grams of water per cc of the matrix mat. The preferred mat, containing plants, and with water flowing over and through the mat, has a resistance to airflow of between 0.2 and 0.5 inches of head under an airflow of 0.2 m/s (which equates to 1.2 litres of air per sq.cm. of mat area, per minute).

It is not essential that the material in which the plants are mounted be fibrous, so long as it accepts plant roots. Thus, the material can be e.g a foam. The foam can be flexible, but preferably is rigid; the fitters affix the plants to the foam by poking a hole in the foam, and inserting the roots into the holes. The foam should be of the interconnected-cell type, for conducting the hydroponic water.

The matrix mat is non-structural per se. Or rather, the matrix material may be regarded as semi-structuiral, in the sense that the mat is able to support itself, and the plants embededded within it, provided the mat is supported by fasteners that are arranged in a grid-pattern. The invention is advantageous because there is no inexpensive material that can accept and support plants, and that can also support itself and the plants when configured as a vertical panel.

It is recognised that fibrous materials, as described, and foams, do have enough structural integrity to support themselves between fasteners, if the fasteners are pitched on a grid of such spacing that no point in the matrix-mat is more than about ½ meter, preferably, away from one of the fasteners, and preferably is no more than about ¼ meter. If the fasteners are further apart than that, the mat might stretch and sag, and not support the plants properly, and might even start to fall apart.

In FIG. 1, the matrix material is strong enough to be picked up and handled as a sheet of material (typically, the matrix 34 is two or three cm thick), but by itself the matrix is not strong enough to support the embedded plants. Thus, the matrix should be attached to the support structure 23 using a grid of many suitable fasteners 36, attached to the crests 35 of the ribs.

The support structure 23 as shown lends itself very well to the application. The ribs 26 preferably are disposed vertically, whereby the structure is easily able to support a large weight of plants. (The ribs should not go horizontally, because then the weight of the plants would be acting across the ribs rather than along the ribs.)

The corrugated or ribbed form 24 is provided in four-by-eight-feet sheets. Installations vary from just one sheet to a wall of sheets. The wall 32 may be dozens of square metres, in the case of a foyer of a large hotel or public building, for example. (It is stressed that the apparatuses of the kind as described herein are intended for indoor use, in a location where the body of air to be treated can circulate and recirculate through the fibrous matrix.) The sheets are assembled together, and fixed to the wall, in such manner that the final result presents a large unbroken area of plants. The designer must also see to the hydroponic water processing components, the air fan, etc, but it is simple enough to engineer the apparatus such that these are not visible, or not obtrusive.

As mentioned, the vertical wall of plants will usually be nourished hydroponically. The water flows downwards through the matrix material, at such a rate as to keep the roots of the plants more or less saturated all the time. The water flowrate should be rapid enough that substantially no water is lost per down-pass, so the bottom plants are just as wet as the plants at the top of the panel. But over time, water is lost through evaporation, and provision should be made for make-up water to be added, preferably automatically. Similarly, nutrient levels in the water should be monitored, and made up as required.

Some benefits of providing the matrix support structure 23 as a moulded-plastic corrugated or ribbed form 24, the ribs 26 being disposed vertically, are that such a support structure:

is inexpensive, yet very adequate for the task of physically supporting its own weight plus the weight of the matrix and plants;
is simple to attach to an existing wall, using just a few fasteners into the wall;
the relatively-fragile matrix can easily be pre-attached to the ribbed structure using many fasteners on a close-spaced grid;
is easily adaptable for the task of forming a plenum, and for collecting and conveying air that has passed through the matrix;
is inert and non-biodegradable,and is unaffected by high humidity;
provides an effective barrier for preventing the hydroponic water from ever touching the wall and/or any metal or other degradable materials that might be used to attach the structure to the wall;
is of modular design, in that a large plant area, and large plenum, can be created simply by aggregating several 4 ft×8 ft panels.

One problem that can arise when plant roots are embedded in a loosely matted matrix 34 of the kind as described herein is that, as the plants (and their roots) expand and become established, the resistance to the through-flow of air through the matrix and roots can change. Thus, of the whole matrix area of plants, a plant might have died in one area of the matrix, whereby that zone might present, at least temporarily, a reduced resistance to airflow; the roots might be more dense in another zone of the matrix, whereby the airflow resistance there would be higher. The different resistances might be expected to change over time, as plants flourish and then fade and die.

A large wide plenum chamber would act to equalise the air pressure over the whole area of the panel of plants, and that might not be ideal in the case where the flow resistance can vary. It is preferred, therefore, to equalise the airflow rate through the whole area of the matrix, rather than to equalise the air pressure. The ribbed form 24 can assist in promoting equal air flowrates.

The rear air passageways 28 created by the ribbed form 24 are connected directly to the manifold 29. Thus, air is drawn along the passageways 28 towards the fan 30. The front pockets 40 created by the ribbed form 24 are connected to the passageways 28 by means of holes 42 through the corrugated walls of the ribs of the form 24. Thus, air is drawn laterally through the matrix into the front pockets 40, and thence through the holes 42, into the rear passageways 28.

The holes 42 determine the flowrate of air from the front pockets 40 to the passageways 28. It is a simple matter to make all the holes 42 identical, whereby the resistance to airflow through the holes is identical—as to both time and area. Moreover, the airflow resistance of the holes 42 is comparable to, or greater than, the airflow resistance of the matrix 34. Therefore, if the airflow resistance should decrease over a small area of the matrix (due to one of the plants dying, for instance), the flowrate through that local area does not rise so much as it would if the whole matrix were backed by one large plenum, and one plant died.

The structure 20 lends itself to the configuration where the airflow passing through the matrix and roots enters one of many air-collection pockets, where the pockets are more or less separated from each other, and where the pockets have each an identical degree of communication with other air passageways, leading to the fan. That being so, the rate of airflow into and through any one of the pockets 40 cannot increase all that much (as compared with the other pockets), even through the airflow resistances of different areas of the matrix/roots complex might differ significantly.

Thus, if the matrix were to be mounted in such a manner that all the air passing through the matrix were collected all directly into a single wide open plenum, that would not be preferred, especially for large installations, because then it might happen that there could be large differences in flowrates through the different areas of the matrix.

Figures 2, 6:
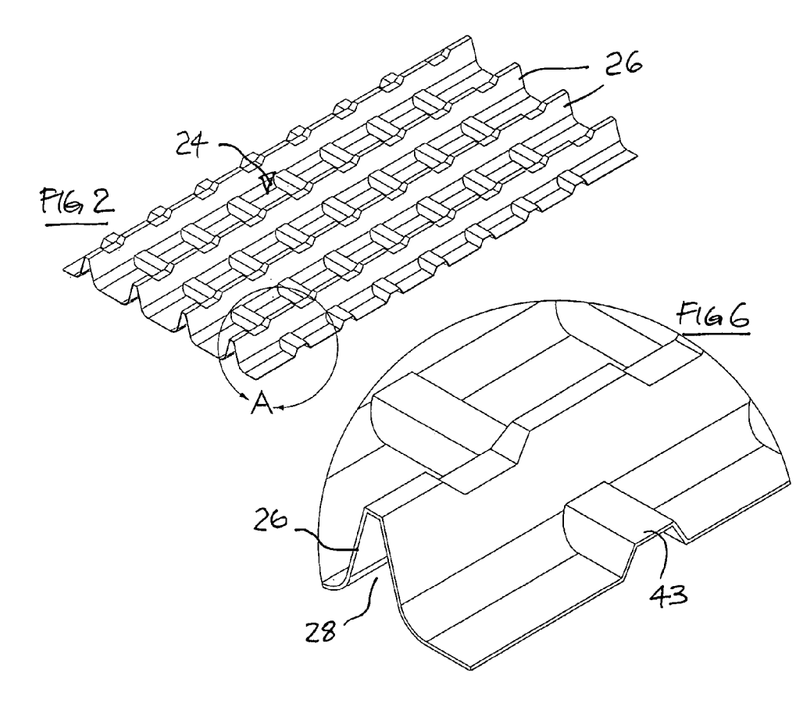
FIG. 2 is a pictorial view of a ribbed-form component of the apparatus of FIG. 1.
FIG. 6 is a close-up of the area A of FIG. 2.
Figure 3:
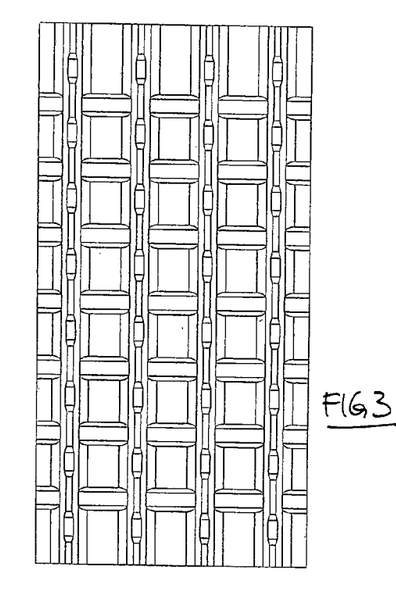
FIGS. 3,4 are front and plan elevations respectively of the component of FIG. 2.
Figure 4:
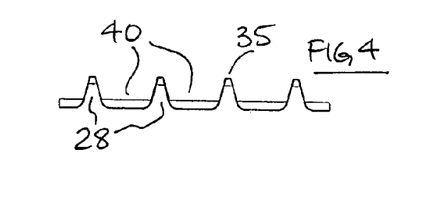
Figure 5:
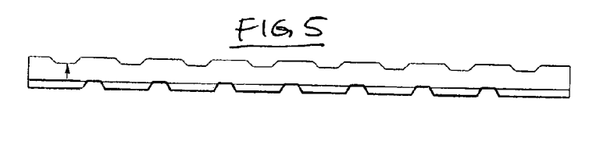
FIG. 5 is a side-elevation of the component, in the same view as FIG. 1.

The ribbed form 24 is specially vacuum-moulded, whereby cross-passageways 43 and other useful details can be built into the moulded form, as shown. If standard plain corrugated plastic sheeting were used, such refinements would not be enabled.

Figure 7:
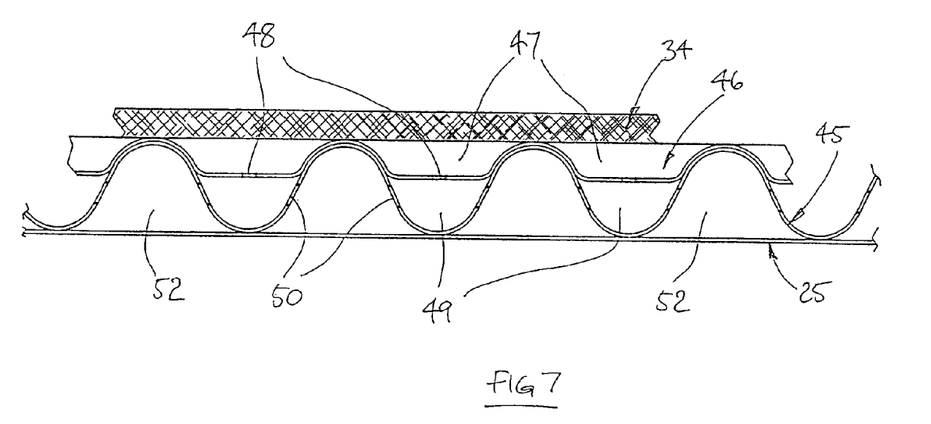
FIG. 7 is a plan view of another apparatus that embodies the invention.
Figure 8:
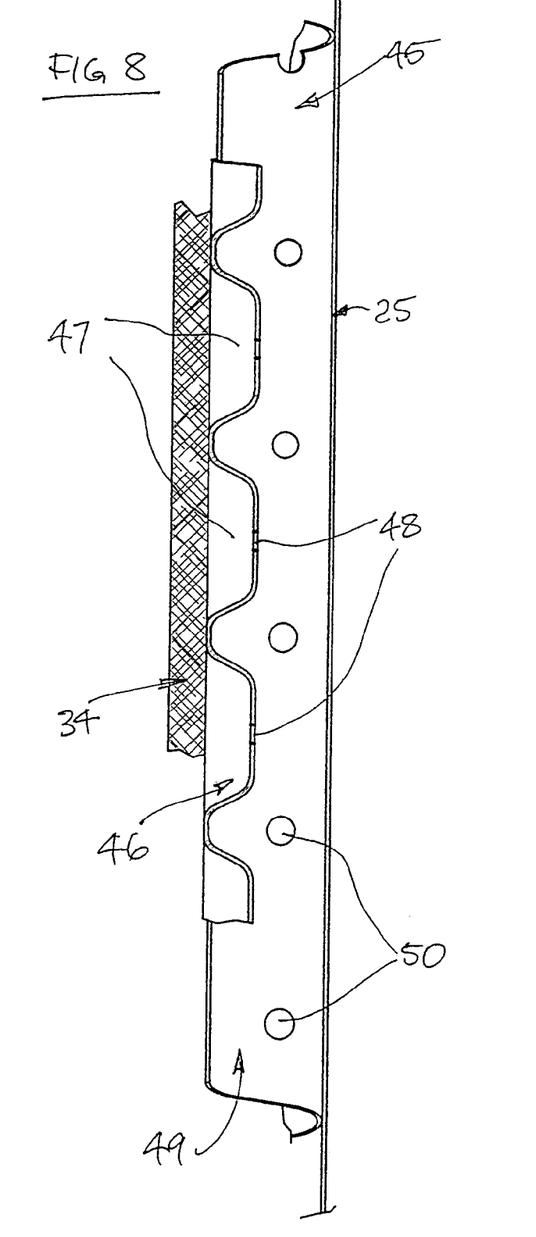
FIG. 8 is a side elevation of the apparatus of FIG. 7.

However, standard plain corrugated plastic sheeting is inexpensively available on a mass market basis, in a number of different thicknesses, pitches, materials, etc, and it would be desirable to use it for that reason. FIGS. 7,8 show an example of the use of standard corrugated sheeting. Here, the corrugated sheeting 45 (again glued to a plain backing sheet 25) is supplemented by a facing sheet 46. The supplemental sheet 46 is specially vacuum-moulded, but now the supplemental sheet has no role in physically supporting the matrix and plants, and so the supplemental sheet 46, though specially moulded, can be of thin flimsy (inexpensive) plastic material.

The supplemental sheet 46 is moulded with many individual pockets 47. Each pocket has an identical air connection (holes 48) with the front chambers 49. Each front chamber 49 has an identical airflow connection (holes 50) with the rear chambers 52. If the holes 48 are open enough, both the front and rear chambers 49,52 may be regarded as forming the plenum. In the FIGS. 7,8 structure, the flowrates through the many pockets 47 are significantly less variable than they would be if the whole matrix area were connected directly to a large common plenum.

Figure 9:
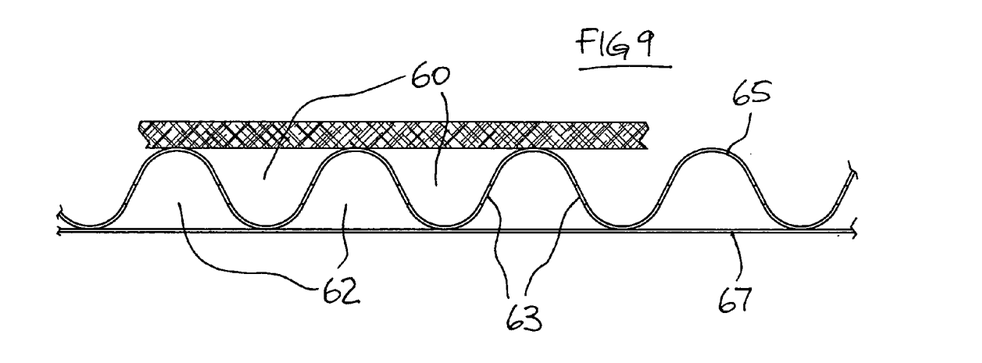
FIG. 9 is a plan view of another apparatus that embodies the invention.

In an installation where the air circulation fan is above the matrix, as in e.g FIG. 9, it is better for the air to transfer laterally, i.e horizontally, out of the front pockets 60 that are directly in contact with the matrix, and into the rear chambers 62, before moving vertically. Apertures 63 provide for such horizontal transfer. That it is say, it is better that the air should not be drawn vertically directly from the front pockets 60.

Figure 10:
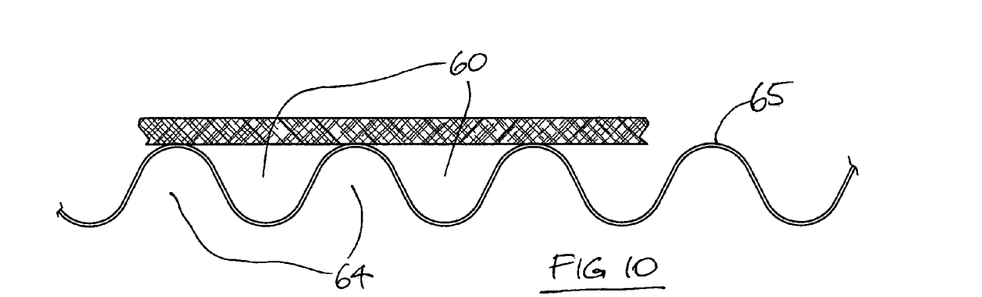
FIG. 10 is a plan view of another apparatus that embodies the invention.

FIG. 10, however, shows an arrangement in which the air is drawn vertically directly it passes through the matrix and enters the front pockets 60. There are no apertures connecting the front pockets 60 with the rear spaces 64. The disadvantage in FIG. 10 is that there might be a tendency for the air in the pockets nearest the fan to be sucked through the matrix more vigorously. By having the air pass horizontally through the front pockets 60, and then vertically through the rear chambers 62 (FIG. 9), this tendency can be minimised. Again, in FIG. 9, the apertures 63 between the front pockets 60 and the rear chambers 62 should be small enough that the flow rates can be focused and directed in this manner. If the apertures 63 were very large, it would be as if the different chambers and pockets were not differentiated.

The directional control of airflow and flowrates as described would probably only need to be used on the larger installations. On small installations, FIG. 10 could be adequate. It should be noted that if plant root density were to become depleted in a local area, the hydroponic environment should cause the plants and roots around that area to fill in the gaps, and restore the more nearly uniform air resistance over the whole area of the matrix. Also, the plants should be selected for their ability to quickly fill in open areas of the matrix.

It is on the medium sized (i.e where the area of the matrix is more than e.g ten square metres), and larger, installations that the designer might find it worthwhile to take steps to minimise the funnelling-through effect resulting from the inevitable local reductions in airflow resistance over a small area of the matrix.

Of course, there will always be some inequalities in the airflow resistance over different areas of the matrix, and the airflow will be greater through the less dense areas. The flowrate through an area A could be made more independent of density changes in an area B if the areas were sealed off from each other and if air were drawn through the areas A and B by separate fans. It is recognised, however, that sealed off areas and separate fans are not required, even in the larger installations (over e.g fifty square metres); it is recognised that local funnelling-through can be effectively minimised by channelling and directing the airflows by means of the chambers and pockets, etc, as described.

In FIGS. 9 and 10 the matrix material is supported by being attached to simple corrugated plastic sheeting 65. In FIG. 10, there is no airflow in the spaces 64 behind the corrugated sheeting. In FIG. 9, a backing sheet 67 is required, to define the rear chambers or ducts 62.

Figure 11:
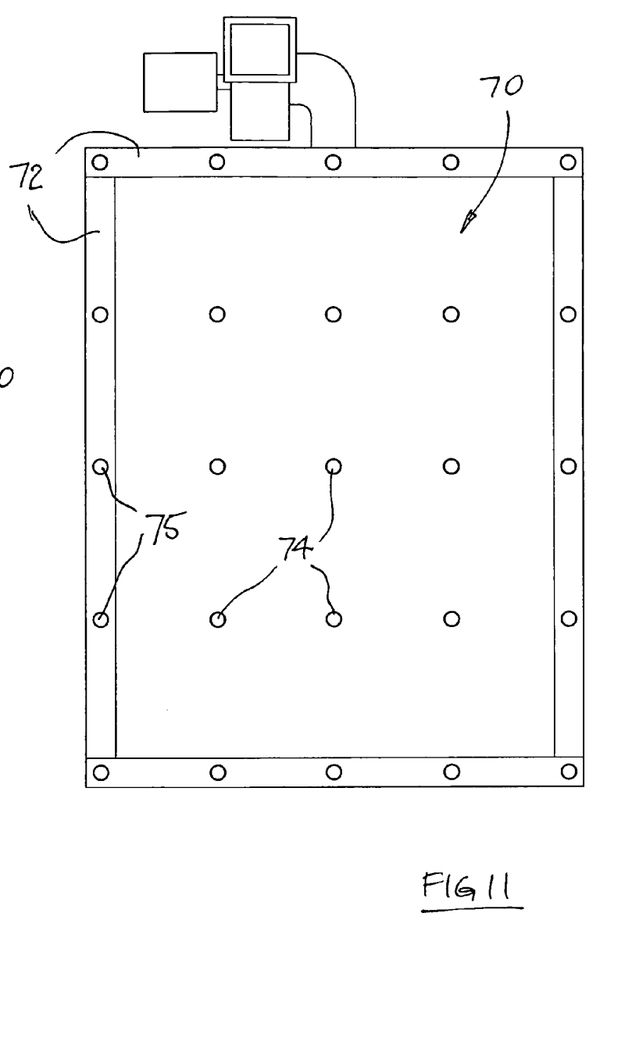
FIG. 11 is a front view of another apparatus that embodies the invention.
Figure 12:
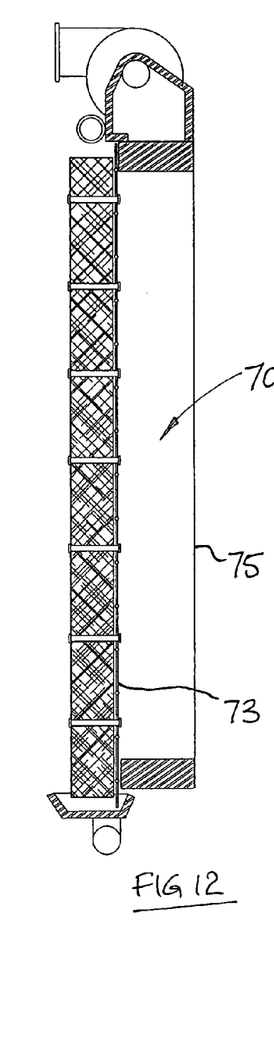
FIG. 12 is a sectioned side-view of the apparatus of FIG. 11.

In the FIGS. 11,12 apparatus, which again is suitable for a small installation, just one single open plenum 70 is provided. The plenum is defined by a simple rectangular framework made of wooden studs 72. The matrix in this case is fastened to a netting mesh 73, of plastic or stainless steel, using fasteners 74,75 arranged in a grid formation. The side-edge fasteners 75 not only hold the matrix 34 to the mesh 73, but also hold the mesh to the studs 72. A plain sheet of plastic 75 defines the back side of the plenum 70.

The plastic (or stainless steel) mesh 73 has no ability to contain air, and is present simply to provide mechanical support for the matrix material, in the central area away from the studs. In fact, in the other designs, as shown, a similar mesh may be used to provide support for the matrix. If a mesh is provided, the grid of fasteners may be provided between the matrix and the mesh, and then the mesh (being stronger than the matrix material) can be attached to (i.e hung from) the mechanical supports at just a small number of attachment points.

As mentioned, the materials used in the apparatus preferably should be unaffected by humidity, and of course wood does not meet that requirement. Therefore, in order for the construction shown in FIGS. 11,12 to be contemplated, the designer should ensure that at least the exposed surfaces be made watertight. Mere painting probably would not be good enough; spraying with e.g an epoxy sealant is preferred. Again, the materials should be such that they do not degrade over a long service life under the adverse conditions in which the apparatus is operated, and similarly the materials should be inert with respect to (i.e they should not affect) the biological processes that take place in the apparatus.

Given that it is possible to seal wood very effectively by the use of plastic sprays etc, the designer might wish to consider wooden studs, plywood sheets, etc, for use in especially custom deigns, where, for example, the wall to which the apparatus is to be applied is not a plain open rectangle, but includes recesses, corners, pillars, windows, or the like, or is otherwise unsuitable for treatment using the described standardised plastic forms.

The plants should not be added to the matrix until the matrix has been suspended in its final position. On the other hand, it is preferred that much of the construction of the mechanical support for the plants be prepared beforehand, preferably in a factory. The manner of construction of the apparatus as described herein lends itself to pre-manufacture and assembly—as compared with, say, making up the apparatus from wooden studs, plywood sheets, steel angles, etc, on an in-situ, custom-made-from-scratch basis. Generally, indoor walls of (air-conditioned) buildings are not built to withstand high humidity and microbiological action, and the surface of the wall itself should not be directly exposed thereto.

(In this specification, it should be noted that the vertical configuration of the apparatus, as referred to, includes cases where the apparatus is inclined at a small angle to the true geometric vertical, as an aid to the even distribution and flow of the hydroponic water.)

The invention claimed is:

1. Apparatus for mechanically supporting growing plants in a vertical orientation, wherein:
   the apparatus incudes a plant-supporting matrix-mat;
   the apparatus includes a backing-structure;
   the apparatus includes a set of fasteners, by which the matrix-mat is mechanically fastened to the backing-structure;
   the fasteners are pitched on a grid of such spacing that no point in the matrix-mat is more than a distance L away from one of the fasteners;
   where L is no more than about ½ meter, and preferably is no more than about ¼ meter;
   the matrix-mat includes at least one unitary panel of mat material, having an area of between two and ten sq. meters;
   the material of the matrix-mat is of such structure, and of such thickness, as to possess the following physical characteristics:
   (a) the material of the matrix-mat is such that the roots of a plant can be inserted into the matrix-mat, and, when the matrix-mat is orientated vertically, the plant is mechanically firmly supported in and by the matrix-mat;
   (b) the matrix-mat is semi-structural, in that the material thereof is inherently capable of supporting itself and plants embedded therein, but only when the matrix-mat is supported by the fasteners pitched on the said grid-pattern; and
   (c) the material of the matrix-mat is inert, and non-biodegradable with respect to plant growth and associated micro-biological action;
   the apparatus includes a backing-structure support, which is effective to support the backing-structure, with the matrix-mat fastened thereto, in a vertical orientation.
   the materials of the apparatus are non-degradable with respect to a humid indoor environment;
   the plants have been inserted by their roots into the material of the matrix-mat; and
   the apparatus includes a hydroponic watering system, comprising a water-depositor, a water-collector, and a water-circulator, wherein:
   (a) the water-depositor is structured to so deposit water onto an upper location of the matrix-mat that the water trickles down through the matrix-mat, wetting the roots of the plants;
   (b) the water-collector is structured to collect water that emerges from a lower location of the matrix-mat; and
   (c) the water-circulator is structured for circulating the water collected in the water-collector back to the water-depositor.

2. Apparatus of claim 1, wherein:
   the material of the matrix-mat comprises fibres of biologically inert and nondegradable plastic;
   the material is free of toxic resins and glues;
   the fibres are matted to form a coherent piece of bulx fibrous material; and
   the fibrous material is so structured that a plant can be inserted into the fibrous material by a plant-fitter manually poking a hole in the material, and fitting the roots of the plant into the hole.

3. Apparatus of claim 2, wherein:
   the bulk fibrous material has a density between 0.02 and 0.05 grams per cc;
   the fibre is between 0.15 mm and 0.4 mm, in diameter, or is between 400 and 800 denier;
   most of the fibres in the mat are at least about five cm long;
   the piece of fibrous matrix-mat is between 1.5 cm and 4 cm thick, whereby the matrix-mat can be compressed with the fingers, and springs back slowly when released;
   the matrix-mat has a water holding capacity of between 0.02 and grams of water per cc of the matrix-mat; and
   the matrix-mat, when containing plants and with water flowing over and through the matrix-mat, has a resistance to airflow of between 0.2 and 0.5 inches of head under an airflow of 0.2 metres/second.

4. Apparatus of claim 3, wherein the matrix-mat is formed from a plurality of single pieces of fibrous mat material, each having an area of between two and ten sq. metres.

5. Apparatus of claim 1, in combination with a vertical wall, wherein:
   the backing-structure-support includes hanging fixtures, by which the backing-structure is affixed to the wall;
   the arrangement of the combination is such that the surface of the wall is not exposed directly to air that has passed through the matrix-mat.

6. Apparatus of claim 1, wherein:
   the vertically oriented matrix-mat, with the plants attached, is permeable to a flow of air passing horizontally therethrough;
   the apparatus includes a power air-circulator which is effective to move air horizontally through the matrix-mat; and
   the arrangement of the apparatus is such that air moving through the mat passes over and through the wetted roots of the inserted plants.

7. Apparatus of claim 6, wherein:
   the matrix-mat is located indoors, inside a room, and is so arranged that air passing through the matrix-mat is air from the room;
   the air-circulator includes an air-chamber located behind the matrix-mat, and is effective to draw air through the matrix-mat, into the air-chamber, and to circulate the air thence back into the room;
   whereby the air in the room continually circulates and recirculates through the matrix-mat.

8. Apparatus of claim 1, wherein:
   the apparatus includes a front-form;
   the backing-structure is incorporated into the front-form;
   the arrangement of the matrix-mat and of the front-form is such that, in side view of the matrix-mat, (a) in touching-areas of the matrix-mat the matrix-mat touches the front-form, and (b) in non-touching-areas of the matrix-mat the matrix-mat is spaced away from the front-form;
   in the touching-areas, the touching-areas substantially inhibit air locally from passing through the matrix-mat;
   the arrangement of the matrix-mat and of the front-form is such that, in front view of the matrix-mat, the touching-areas separate the respective non-touching-areas;
   whereby the air-chamber located behind the matrix-mat includes respective separated air-containment-pockets, the air-containment pockets being defined by the respective non-touching-areas; and the air-circulation-means is so arranged as to draw air through the non-touching-areas of the matrix-mat and into the respective air-containment pockets.

9. Apparatus of claim 8, wherein:

The front-form is formed with respective apertures, which connect the air-containment-pockets with a plenum chamber, which is located to the rear of the air-containment pockets;

the air-circulation means is effective to urge air to pass from the air-containment-pockets laterally into the plenum chamber, through the said apertures;

the apertures are small enough that, during operation of the air-circulation means, there exists a pressure differential between the air-circulation-pockets and the plenum chamber.

10. Apparatus of claim 1, wherein the fasteners pass through holes in the mat-support-means and the matrix-mat.

11. Apparatus of claim 1, wherein the mat-support-means includes a corrugated sheet of plastic.

12. Apparatus of claim 1, wherein:

the material of the matrix-mat is an interconnected-cell plastic foam;

the plastic foam is of such structure that a plant can be inserted into the foam by a plant-fitter manually poking a hole in the foam, and fitting the roots of the plant into the hole.

13. Apparatus of claim 1, wherein the backing-structure is of a ribbed form, having crests, and the fasteners pass through the matrix-mat and are attached to the crests of the ribs.

* * * * *